(12) United States Patent
Chen et al.

(10) Patent No.: US 7,605,365 B2
(45) Date of Patent: Oct. 20, 2009

(54) WATER PHANTOM WITH FIXED WATER LEVEL FOR MEASURING DOSE OF IONIZING RADIATION ABSORBED TO WATER AND THE METHOD THEREOF

(75) Inventors: Chun-Liang Chen, Taoyuan County (TW); Shi-Hwa Su, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 0 days.

(21) Appl. No.: 12/199,135

(22) Filed: Aug. 27, 2008

(65) Prior Publication Data

US 2009/0084973 A1    Apr. 2, 2009

(30) Foreign Application Priority Data

Oct. 2, 2007    (TW) .............................. 96136840 A

(51) Int. Cl.
*G12B 13/00*    (2006.01)
(52) U.S. Cl. .................................. 250/252.1
(58) Field of Classification Search ............... 250/252.1
See application file for complete search history.

(56) References Cited

U.S. PATENT DOCUMENTS

| | | | | |
|---|---|---|---|---|
| 5,621,214 A | * | 4/1997 | Sofield | 250/375 |
| 5,627,367 A | * | 5/1997 | Sofield | 250/252.1 |
| 5,635,709 A | * | 6/1997 | Sliski et al. | 250/252.1 |
| 7,193,220 B1 | * | 3/2007 | Navarro | 250/374 |
| 2008/0048125 A1 | * | 2/2008 | Navarro | 250/389 |

* cited by examiner

*Primary Examiner*—David P Porta
*Assistant Examiner*—Mark R Gaworecki
(74) *Attorney, Agent, or Firm*—WPat, PC; Justin I. King

(57) ABSTRACT

A water phantom structure with fixed water level for measuring dose of ionizing radiation absorbed to water and the method thereof are disclosed, in which the water phantom structure comprises: a tank, enclosed by four wall plates and a bottom plates, all made of an isohydric material, and having 95% of its volume to be filled with a water solution; a concave lid, being a plate configured with a fillister and made of an isohydric material to be placed in the tank while floating on the water solution for settling the water level of the water solution from undulating and thus capable of acting as a reference water level; and a moving device. The aforesaid water phantom structure can be applied in operations for measuring or calibrating output radiation doses emitted from devices such as medical gamma-ray radiation devices or linear accelerators, using which the measurement will not be interfered by the undulation of water level commonly seen in those conventional water phantom since the aforesaid water phantom structure is able to provide a fixed water level by suppressing such undulation with the concave lid.

13 Claims, 4 Drawing Sheets

WATER PHANTOM WITH FIXED WATER LEVEL FOR MEASURING DOSE OF IONIZING RADIATION ABSORBED TO WATER AND THE METHOD THEREOF

FIELD OF THE INVENTION

The present invention relates to a water phantom structure with fixed water level for measuring dose of ionizing radiation absorbed to water and the method thereof, and more particularly, to a method capable of measuring dose of ionizing radiation absorbed to water without being affected by the undulation in water level as the water level undulation is being suppressed by a concave plate made of a water-equivalent material.

BACKGROUND OF THE INVENTION

Generally, it is common to use a water phantom for measuring radiation dose outputted from radiation devices such as X-ray generators, Co-60 therapeutical apparatuses and linear accelerators, as well as the quality control regarding the same, by which the radiation dose generated from those radiation devices can be calibrated for enabling the same to conform with standard dose for medical treatments, and the same time that as their output radiation characteristics can be evaluated. With respect to its functionality, the water phantom is featuring in that: a good water phantom should be designed with a specific volume that is large enough for sustaining a scattered radiation in a saturated manner, and moreover, it should be able to maintain a stable water level so that the thickness measured between an inspection point submerged in the water phantom and its water level can be maintained without changing with the undulation of the water level and thus prevent the dose measurement from being interfered by the undulation of water level.

Please refer to FIG. 1, which shows a conventional water phantom. The water phantom of FIG. 1 is comprised of: a tank 11, a water solution 12, a mobile rack 13, and an ionization chamber 14. The mobile rack 13 as well as the ionization chamber 14 attached thereto can be driven to move by a motor. It is noted that the reference level for measurement in the aforesaid water phantom is its water level, and it has the following shortcomings:

(1) As the mobile rack 13 can be driven to move in the tank 11 in a three-dimensional manner, i.e. it can be driven to move up, down, front, back, left or right in the tank 11, the movement of the mobile rack 13 will cause the water level of the water solution 12 to undulate and thus further cause the depth of the ionization chamber 14 to vary accordingly in a continuous manner during a radiation measurement so that the accuracy of the measurement will be adversely affected.

(2) As the reference level of the water solution 12 can be affected by its surface tension that it is difficult to define and measure, the depth of any location submerged in the water solution 12 is difficult to obtained and can be erroneous.

(3) As the raising/descending of the mobile rack 13 will cause the reference level of the water solution 12 to changed accordingly, the radiation measurement will be interfered so that measurement may be erroneous.

Therefore, it is in need of a water phantom structure with fixed water level for overcoming the aforesaid shortcomings.

SUMMARY OF THE INVENTION

In view of the disadvantages of prior art, the object of the present invention is to provide a water phantom structure, being comprised of: a tank, enclosed by four wall plates and a bottom plate, all made a water-equivalent material, and having 95% of its volume to be filled with a water solution; a concave lid, being a plate made of an isohydric material to be placed in the tank while floating on the water solution for settling the water level of the water solution from undulating and thus defining a reference water level that is lower than its neighboring water level; and an ionization chamber, being attached to a mobile rack while positioning the same directly underneath the reference water level; wherein, when the ionization chamber is moved up, down, left or right in the tank by the mobile rack, the reference water level will not by affected by the movement and remain stable so that the measurement error cause by the undulating water solution can be prevented.

It is another object of the invention to provide a water phantom structure with fixed water level, which can prevent an erroneous measurement from occurring as its fixed water level can be measured easily without causing any error while measuring the depth of the ionization chamber submerged in the tank.

Yet, another object of the invention is to provide a water phantom structure that can regulate its water level by the use of a regulation tank according to the raising/descending of its mobile rack, for maintaining a reference water level of the water phantom structure to be fixed.

Furthermore, another object of the invention is to provide a water phantom structure which is configured with a three-axial motor mechanism, as that shown in FIG. 3, for enabling the radiation measurement using the water phantom structure to be controlled by a computer and thus performed automatically.

To achieve the above objects, the present invention provides a water phantom structure with fixed water level for measuring dose of ionizing radiation absorbed to water, which comprises: a tank, enclosed by four wall plates and a bottom plate, all made a water-equivalent material, and having 95% of its volume to be filled with a water solution; an ionization chamber; a three-axial motor mechanism, for mounting on the opening of the tank and capable of clasping and holding the ionization chamber to move in a three-axial movement defined in a Cartesian coordinate system of a X-axis, a Y-axis and a Z-axis; and a concave lid, being a plate configured with a fillister and made of an isohydric material to be placed in the tank while floating on the water solution for settling the water level of the water solution from undulating and defining a reference water level thereby; wherein the concave lid can be driven to move by a Y-axis control of the three-axial motor mechanism in a manner that the ionization chamber is located at a position directly under the concave lid; the aforesaid water phantom structure can be applied in operations for measuring or calibrating output radiation doses emitted from devices, using which the measurement will not be interfered by the undulation of water level commonly seen in those conventional water phantom since the aforesaid water phantom structure is able to provide a fixed water level, and the depth of the ionization chamber will not be affected by the volume of the part of the motor mechanism that is attached to the ionization chamber and submerged in the water.

Preferably, the tank of the water phantom structure with fixed water level is made of an isohydric material selected from acrylic, plastic steel, and other materials whose density is about the same as that of water.

Preferably, the three-axial motor mechanism is made of a material selected from aluminum, aluminum alloy, and plastic steel.

Preferably, the concave lid is made of a material whose density is about the same as that of water Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

In an exemplary embodiment of the invention, a water phantom structure with fixed water level for measuring dose of ionizing radiation absorbed to water is disclosed, which comprises: a tank, enclosed by four wall plates and a bottom plate, all made of an isohydric material, and having 95% of its volume to be filled with a water solution; a concave lid, being a plate configured with a fillister and made of an isohydric material to be placed in the tank while floating on the water solution for settling the water level of the water solution from undulating and thus capable of acting as a reference water level; and a moving device. The aforesaid water phantom structure can be applied in operations for measuring or calibrating output radiation doses emitted from devices such as medical gamma-ray radiation devices or linear accelerators, using which the measurement will not be interfered by the undulation of water level commonly seen in those conventional water phantoms since the aforesaid water phantom structure is able to provide a fixed water level by suppressing such undulation with the concave lid.

Figure 1:
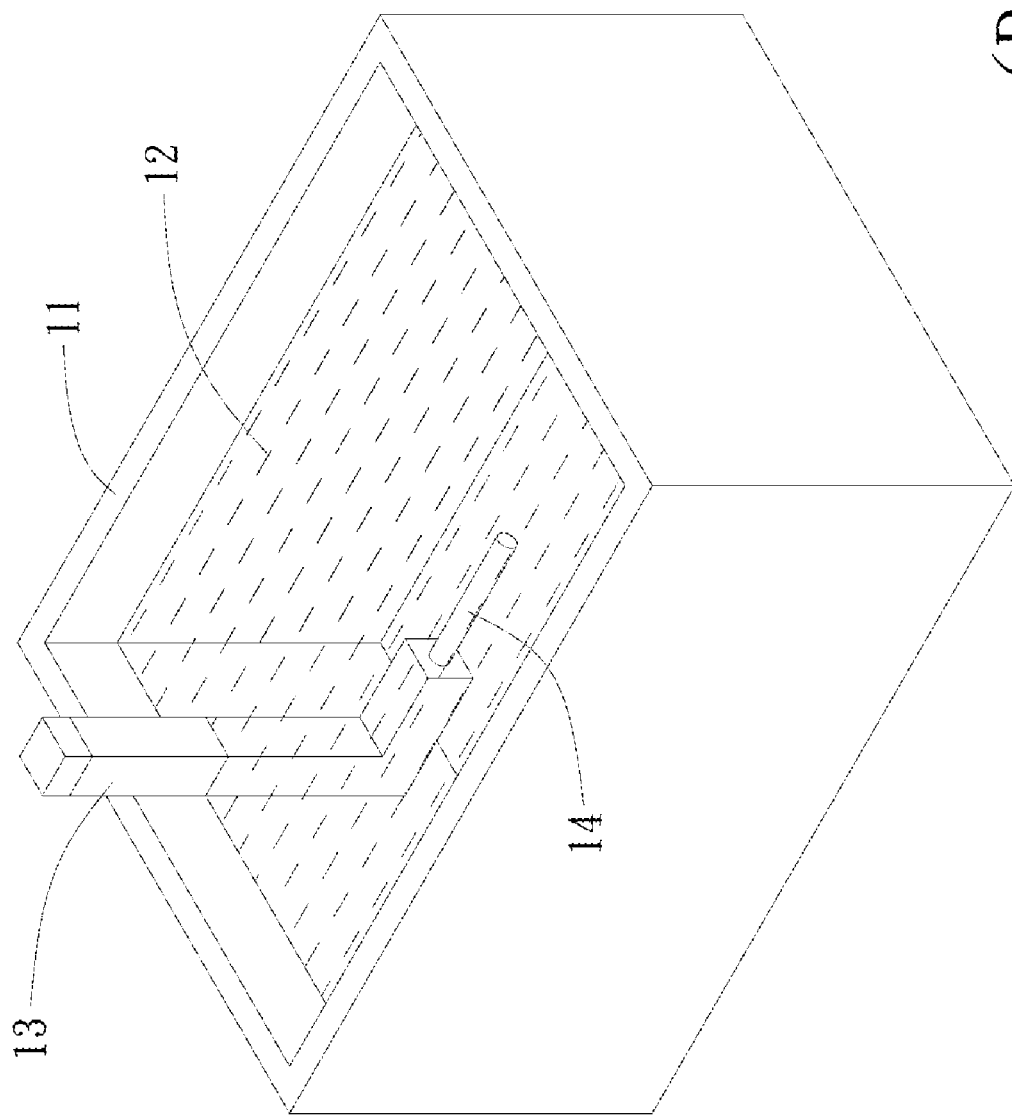
FIG. 1 shows a conventional water phantom.
Figure 2:
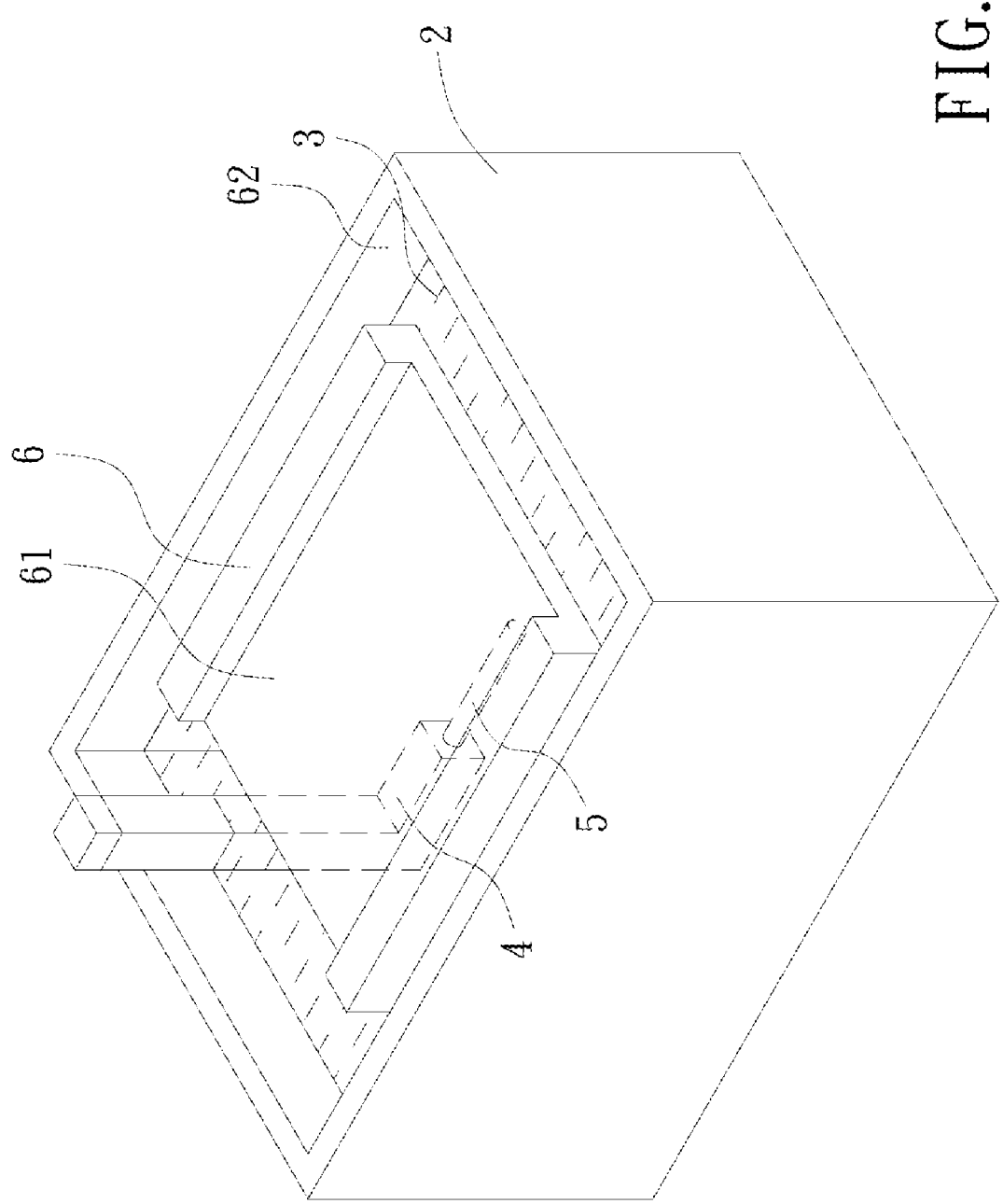
FIG. 2 is a schematic diagram showing a water phantom structure with fixed water level for measuring dose of ionizing radiation absorbed in water according to an exemplary embodiment of the invention.

Please refer to FIG. 2, which is a schematic diagram showing a water phantom structure with fixed water level for measuring dose of ionizing radiation absorbed in water according to an exemplary embodiment of the invention. As shown in FIG. 2, the tank 2 of the water phantom structure with fixed water level is composed of four wall plates and a bottom plate that are all made of a water-equivalent material and filled with a water solution 3. It is noted that the cross section of the tank 2 can be formed as a rectangle shape or a square shape of any dimension as required. On the opening formed on the top of the tank 2, there is a lid which can be a plate configured with a fillister 6 and made of a water-equivalent material to be placed in the tank 2 while floating on the water solution for settling the water level of the water solution from undulating and thus capable of acting as a reference water level 61. The lid with the fillister 6 is designed for enabling the reference water level 61 to be slightly lower than its neighboring water level of the water solution 3, and is configured in a manner that it can be detached and separated from the tank 2 easily. In addition, the lid is so disposed in the tank for enabling the ionization chamber 5 to be position right underneath the reference water level 61. Moreover, when the ionization chamber is brought to be moved by the clipping device 4 to move up, down, left or right in the tank, such movement will not cause any undulation to the reference water level 61 as the reference water level is made of a solid substance so that no conventional measurement error caused by the undulation of water level will occur and thus an accurate measurement can be achieved.

The tank 2 as well as the lid defining the reference water level 61 are all made of an acrylic and a water-equivalent material whose density is the same as that of water. It is noted that the water-equivalent material is named as it is a material whose density is about the same as that of water. As the lid is made of the water-equivalent material, the reference water level can float on water solution 3.

Figure 3:
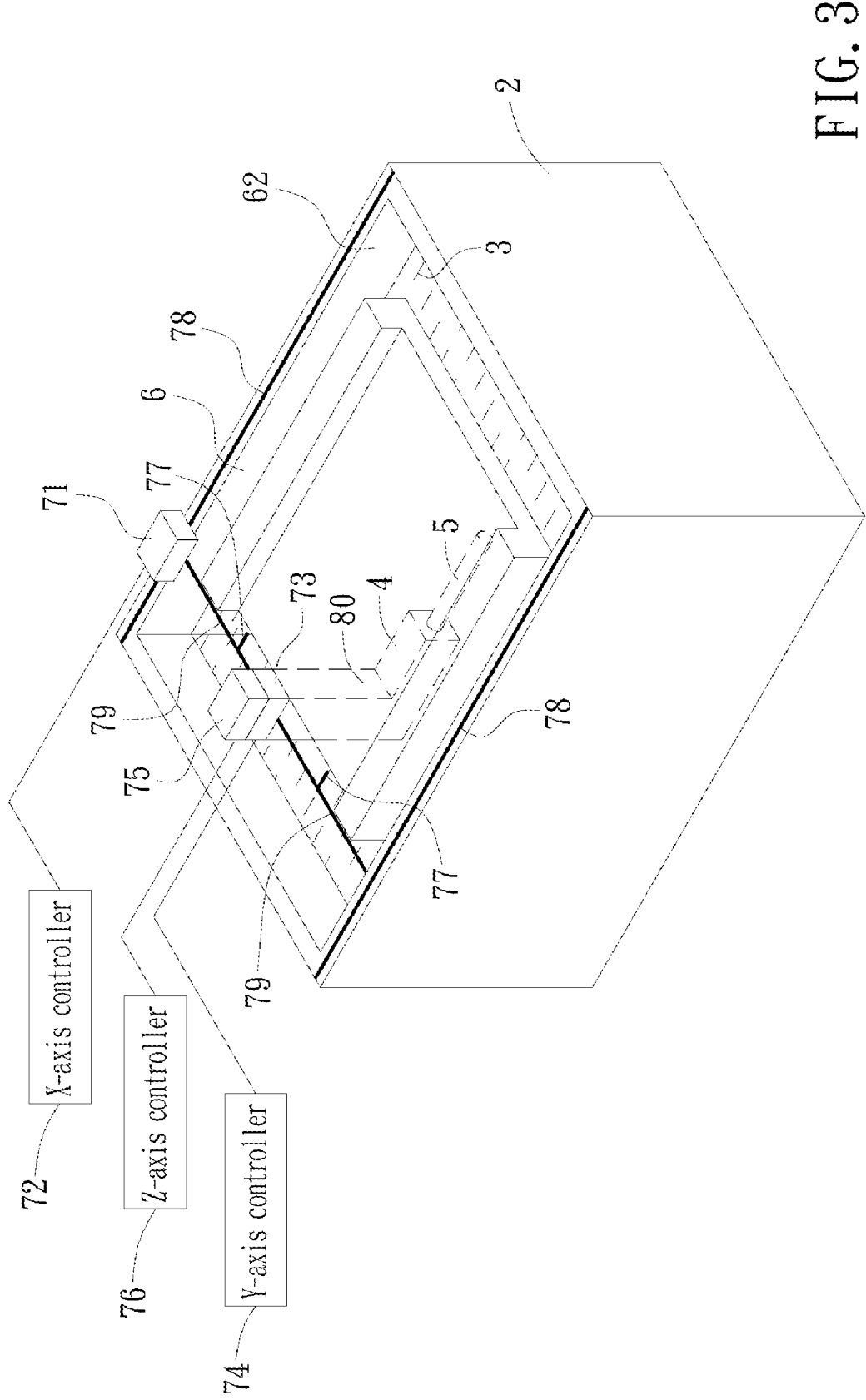
FIG. 3 is a schematic diagram showing the water phantom structure of FIG. 2 with an additional servo motor.

Please refer to FIG. 3, which is a schematic diagram showing the water phantom structure of FIG. 2 with an additional servo motor. In FIG. 3, the water phantom structure is comprised of: a tank 2, an X-axis servo motor 71, a Y-axis servo motor 73, a Z-axis servo motor 76, an X-axial rail 78, a Y-axial rail 79, a Z-axial screw rod 80, a clipping device 4, an ionization chamber 5, a lid defining a reference water level 61, at least a linkage rod 77, at least a regulation well 62, an X-axis controller 72, a Y-axis controller 74 and a Z-axis controller 76. As shown in FIG. 3, the servo motor is connected to the lid by the use of the linkage rod 77. The clipping device 4 is designed for clasping the ionization chambers 5 of various sizes. The three servo motors 71, 73, 75 are made of aluminum, aluminum alloy or plastic steel.

In an exemplary embodiment, the water phantom structure, being configured with the three-axial motor mechanism as that shown in FIG. 3, can be connected to a computer, by which any radiation measurement using the water phantom structure can be controlled by the computer and thus performed automatically. Operationally, as soon as the ionization chamber 5 is being fitted in the clipping device 4 and specific coordinates with respect to a Cartesian coordinate system whose X-axis, Y-axis and Z-axis are defined conforming respectively to the X-axis controller 72, the Y-axis controller 74 and the Z-axis controller 76 are inputted thereto, the start button can be pressed so that the X-axis servo motor 71 will start to move along the X-axial rail 78, the Y-axis servo motor 73 will start to move along the Y-axis rail 79 and the Z-axis servo motor 80 will bring along the Z-axis screw rod to rotate, by which the ionization chamber 5 is moved to a location in the tank 2 conforming to the inputted coordinated.

Figure 4:
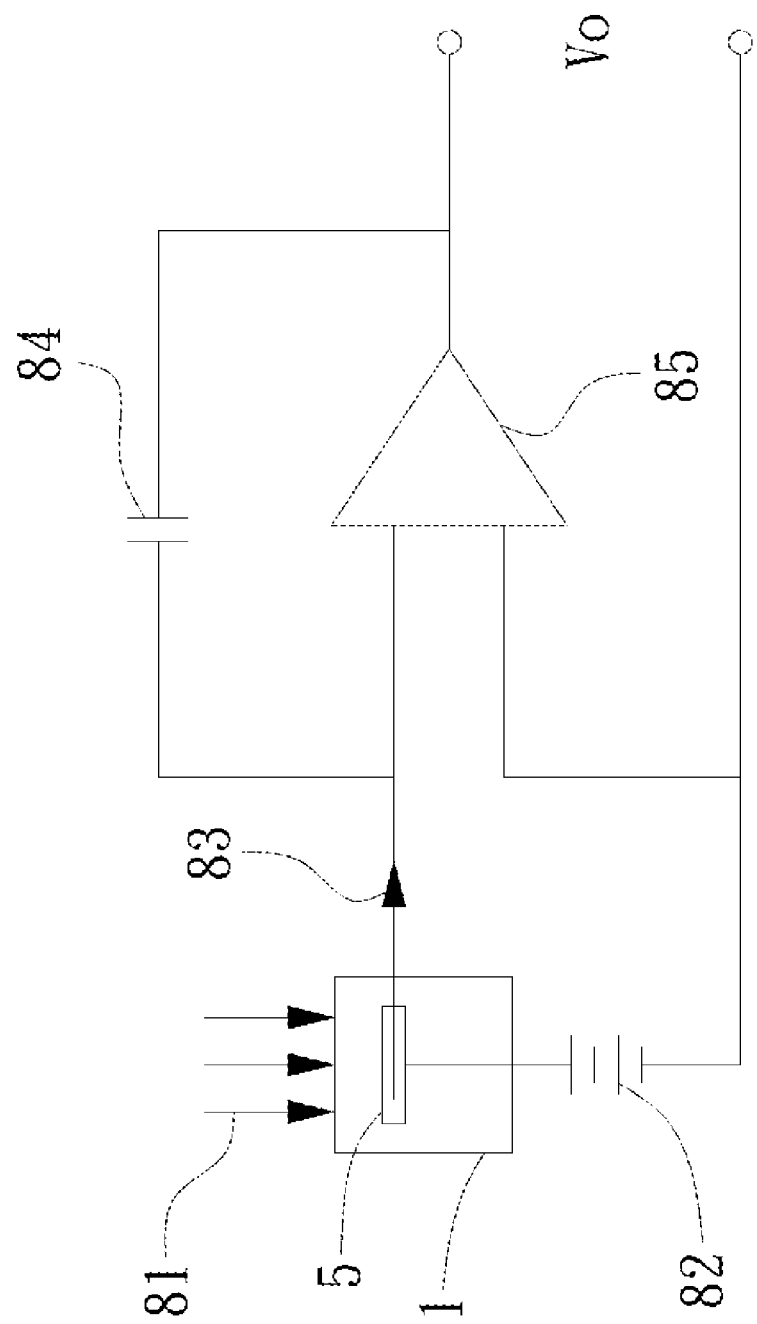
FIG. 4 is a circuit diagram depicting how the ionization chamber is connected for radiation measurement.

Please refer to FIG. 4, which is a circuit diagram depicting how the ionization chamber is connected for radiation measurement. When the aforesaid water phantom structure is applied in operations for measuring or calibrating output radiation doses emitted from devices such as medical gamma-ray radiation devices or linear accelerators, the ionization chamber 5 in the tank 1 is connected to a static electrometer 85 which is further connected to a high voltage source 82, by which the high voltage of the high voltage source 82 can cause a current 83 to be generated in the ionization chamber 5 as soon as the ionization chamber 5 is irradiated by a radiation, causing an ionization reaction in the ionization chamber 5, while guiding the current 83 to the input end of the static electrometer 85 and a charging capacitor 84, thereby an output signal relating to the current 83 of the ionization reaction can be measured at the output end V, of the static electrometer 85.

From the above description with reference to FIG. 2 to FIG. 4, the present invention provides a water phantom structure, being comprised of: a tank, enclosed by four wall plates and a bottom plates, all made an isohydric material, and having 95% of its volume to be filled with a water solution; a concave lid, being a plate made of an isohydric material to be placed in the tank while floating on the water solution for settling the water level of the water solution from undulating and thus defining a reference water level that is lower than its neighboring water level; and an ionization chamber, being attached to a mobile rack while positioning the same directly underneath the reference water level; wherein, when the ionization chamber is moved up, down, left or right in the tank by the mobile rack, the reference water level will not by affected by the movement and remain stable so that the measurement error caused by the undulating water solution can be prevented. In addition, the water phantom structure with fixed water level of the invention can prevent an erroneous measurement from occurring as its fixed water level can be measured easily without causing any error while measuring the depth of the ionization chamber submerged in the tank. Yet, the water phantom structure of the invention can regulate its water level by the use of a regulation tank according to the raising/descending of its clipping device, by which a reference water level of the water phantom structure can be maintained fixedly without change.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water phantom structure with fixed water level for measuring dose of ionizing radiation absorbed to water, comprising:
   a tank, configured with an opening on top thereof for receiving a water solution;
   at least a servo motor, for providing a driving force;
   an ionization chamber, connected to a static electrometer which is further connected to a high voltage source for using the high voltage of the high voltage source to cause a current to be generated in the ionization chamber as soon as the ionization chamber is irradiated by a radiation, causing an ionization reaction in the ionization chamber, while enabling the static electrometer to measure a signal relating to the current of the ionization reaction;
   a clipping device, for clasping the ionization chamber and being connected to the at least one servo motor in a manner that it is driven to move by the driving force of the servo motor and thus bring along the ionization chamber to move in the tank accordingly; and
   a lid, capable of being placed in the tank while floating on the water solution for defining a reference water level thereby;
   wherein, the area of the reference water level defined by the lid is larger than the allowable moving range of the ionization chamber.

2. The water phantom structure with fixed water level of claim 1, further comprising:
   at least a regulation well, each being formed in the tank where its opening in not covered by the lid.

3. The water phantom structure with fixed water level of claim 1, wherein the tank has a cross section which is formed in a shape selected from the group consisting of a rectangle and a square.

4. The water phantom structure with fixed water level of claim 1, wherein the tank is made of a material selected from an acrylic and an isohydric material whose density is the same as that of water.

5. The water phantom structure with fixed water level of claim 1, wherein the lid is made of a material selected from an acrylic and an isohydric material whose density is the same as that of water.

6. The water phantom structure with fixed water level of claim 1, wherein the lid is a concave plate formed with a fillister that is made of an isohydric material whose density is the same as that of water.

7. The water phantom structure with fixed water level of claim 1, wherein the at least one servo motor further comprise: an X-axis driving motor; a Y-axis driving motor; and a Z-axis driving motor.

8. The water phantom structure with fixed water level of claim 7, wherein the X-axis driving motor, the Y-axis driving motor and the Z-axis driving motor are connected respectively to an X-axis controller, a Y-axis controller and a Z-axis controller.

9. The water phantom structure with fixed water level of claim 8, wherein the X-axis controller, the Y-axis controller and the Z-axis controller are precision displacement controllers.

10. The water phantom structure with fixed water level of claim 7, wherein the at least one servo motor includes an X-axial rail and a Y-axial rail, while the X-axial rail and the Y-axial rail are orientated conforming to the X-axis and the Y-axis of a Cartesian coordinate system defining a surface coplanar with the lid.

11. The water phantom structure with fixed water level of claim 7, wherein the at least one servo motor includes a water-proof screw rod being orientated perpendicular to a surface coplanar with the lid.

12. The water phantom structure with fixed water level of claim 1, wherein the clipping device is designed for clasping the ionization chamber of various sizes.

13. The water phantom structure with fixed water level of claim 1, wherein the lid is connected to the at least one servo motor by two linkage rods.

* * * * *